(12) United States Patent
Tang et al.

(10) Patent No.: US 8,961,255 B2
(45) Date of Patent: Feb. 24, 2015

(54) MANUFACTURING METHOD FOR FLEXIBLE DISPLAY APPARATUS

(75) Inventors: Wen-Chung Tang, Hsinchu (TW);
Fang-An Shu, Hsinchu (TW);
Yao-Chou Tsai, Hsinchu (TW);
Ted-Hong Shinn, Hsinchu (TW);
Ming-Sheng Chiang, Hsinchu (TW);
Chih-Cheng Wang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 153 days.

(21) Appl. No.: 13/572,712

(22) Filed: Aug. 13, 2012

(65) Prior Publication Data

US 2013/0072079 A1 Mar. 21, 2013

(30) Foreign Application Priority Data

Sep. 16, 2011 (TW) .............................. 100133496 A
May 22, 2012 (TW) .............................. 101118201 A

(51) Int. Cl.
*H01J 9/34* (2006.01)
*G02F 1/1333* (2006.01)

(52) U.S. Cl.
CPC .... *G02F 1/133305* (2013.01); *G02F 1/133351* (2013.01)
USPC ........................................... 445/24; 313/504

(58) Field of Classification Search
CPC .............. G06F 3/041; H01L 2251/566; H01L 51/5237
USPC .......................................................... 445/24
See application file for complete search history.

(56) References Cited

U.S. PATENT DOCUMENTS

| 7,743,492 | B2 | 6/2010 | Kerr et al. | |
| 8,027,000 | B2 | 9/2011 | French et al. | |
| 2006/0254704 | A1* | 11/2006 | Seo et al. | 156/249 |
| 2008/0074730 | A1 | 3/2008 | Cao et al. | |
| 2009/0130609 | A1 | 5/2009 | Irving et al. | |
| 2009/0147167 | A1 | 6/2009 | Park | |
| 2009/0199401 | A1 | 8/2009 | Kerr et al. | |
| 2010/0202076 | A1 | 8/2010 | Liu et al. | |
| 2010/0279578 | A1* | 11/2010 | Matsuzaki et al. | 445/25 |

FOREIGN PATENT DOCUMENTS

CN 101964323 2/2011

OTHER PUBLICATIONS

TW 201128476 partial translation.*

* cited by examiner

*Primary Examiner* — Nimeshkumar Patel
*Assistant Examiner* — Jacob R Stern
(74) *Attorney, Agent, or Firm* — Jianq Chyun IP Office

(57) ABSTRACT

A manufacturing method for a flexible display apparatus is provided. A rigid substrate is provided. A flexible substrate having a supporting portion and a cutting portion surrounding the supporting portion is provided. A first adhesive material is formed between the rigid substrate and the cutting portion of the flexible substrate, so that the flexible substrate is adhered onto the rigid substrate by the first adhesive material. The first adhesive material does not locate on the supporting portion of the flexible substrate. At least a display unit is formed on the supporting portion of the flexible substrate. The supporting portion and the cutting portion of the flexible substrate are separated so as to separate the rigid substrate and the flexible substrate, wherein the flexible substrate and the display unit thereon form a flexible display apparatus. In the method, the flexible substrate and the rigid substrate can be easily separated.

15 Claims, 8 Drawing Sheets

MANUFACTURING METHOD FOR FLEXIBLE DISPLAY APPARATUS

CROSS-REFERENCE TO RELATED APPLICATION

This application claims the priority benefits of Taiwan application serial no. 100133496, filed on Sep. 16, 2011, and Taiwan application serial no. 101118201, filed on May 22, 2012. The entirety of each of the above-mentioned patent applications is hereby incorporated by reference herein and made a part of specification.

BACKGROUND

1. Field of the Invention

The invention relates to a flexible display apparatus, and more particularly to, a manufacturing method for a flexible display apparatus.

2. Description of Related Art

FIG. 1 and FIG. 2 are schematic flow chart diagrams illustrating a conventional manufacturing method for a flexible display apparatus. Referring to FIG. 1, the conventional manufacturing method for the flexible display apparatus is to firstly form a flexible substrate 120 on a glass substrate 110, and then sequentially form an isolation layer 130 and a display unit 140 on the flexible substrate 120. Afterward, as shown in FIG. 2, a laser releasing process is performed, and the flexible substrate 120 is peeled off from the glass substrate 110.

Nevertheless, production machine cost and material cost in the aforementioned method are higher, and during a process of peeling off the flexible substrate 120 from the glass substrate 110, stress imposed on the flexible substrate 120 may damage the components on the flexible substrate 120, and thus deteriorate a production yield.

For this reason, conventional technique provides another manufacturing method for a flexible display apparatus. As shown in FIG. 3, the conventional manufacturing method for the flexible display apparatus is to dispose a release layer 230 with low viscosity on a glass substrate 210, and then cover a flexible substrate 220 on the release layer 230. Afterward, an isolation layer 240 and a display unit 250 are formed on the flexible substrate 220. Next, the flexible substrate 220 is cut along a cutting line L1.

Then, as shown in FIG. 4, the flexible substrate 220 and, the isolation layer 240 and a display unit 250, thereon are peeled off from the glass substrate 210.

Nevertheless, the aforementioned method during a peeling off process still have to apply a stress to separate the glass substrate 210 and the flexible substrate 220, and thus still may damage the components on the flexible substrate 220 and deteriorate a production yield. In addition, a bottom surface 222 of the flexible substrate 220 may be remained with an adhesive material 232 of the release layer 230, which then requires additional time for cleaning, and thus increases a production cost.

SUMMARY OF THE INVENTION

The invention provides a manufacturing method for a flexible display apparatus to enhance a production efficiency of the flexible display apparatus.

In order to achieve the aforementioned advantages, an embodiment of the invention provides a manufacturing method for a flexible display apparatus comprising the following steps. A rigid substrate is provided. A flexible substrate having at least a supporting portion and a cutting portion surrounding the supporting portion is provided. A first adhesive material is formed between the rigid substrate and a cutting portion of the flexible substrate, so that the flexible substrate is adhered onto the rigid substrate by the first adhesive material, wherein the first adhesive material is not located on the supporting portion of the flexible substrate. At least a display unit is formed on the supporting portion of the flexible substrate. The supporting portion of the flexible substrate and the cutting portion are separated so as to separate the rigid substrate and the flexible substrate, wherein the flexible substrate and the display unit thereon form a flexible display apparatus.

In an embodiment, before the display unit is formed, an isolation layer covering the flexible substrate is further formed on the rigid substrate, and the display unit is formed on the isolation layer.

In an embodiment, a material of the isolation layer includes a silicon nitride (SiN), a silicon oxide (SiO), a silicon oxynitride (SiNxOy), or a polyimide (PI).

In an embodiment, steps of forming the first adhesive material between the rigid substrate and the cutting portion of the flexible substrate includes: adhering the first adhesive material at a bottom surface of the flexible substrate opposite to the rigid substrate, and the first adhesive material is located at the cutting portion; and press fitting the bottom surface of the flexible substrate onto the rigid substrate.

In an embodiment, the flexible substrate includes a stainless steel foil or a polyimide (PI) thin film.

In an embodiment, when the first adhesive material is simultaneously formed between the rigid substrate and the cutting portion of the flexible substrate, a second adhesive material is further formed between the supporting substrate of the flexible substrate and the rigid substrate, so that the supporting portion of the flexible substrate is adhered onto the rigid substrate.

In an embodiment, a viscosity of the second adhesive material is smaller than a viscosity of the first adhesive material.

In an embodiment, the second adhesive material includes a planar adhesive material or a plurality of dotted adhesive materials.

In an embodiment, when the first adhesive material is simultaneously formed between the rigid substrate and the cutting portion of the flexible substrate, a plurality of spacers is further formed between the supporting portion of the flexible substrate and the rigid substrate so as to maintain a spacing between the supporting portion of the flexible substrate and the rigid substrate.

In an embodiment, a step of separating the supporting portion and the cutting portion of flexible substrate includes: cutting the flexible substrate along a plurality of cutting lines surrounding the display unit, and the cutting lines are located within a range of the supporting portion of the flexible substrate.

In an embodiment, the cutting portion of the flexible substrate is divided into a peripheral circuit portion surrounding the supporting portion and a peripheral non-circuit portion surrounding the peripheral circuit portion, and the cutting lines are located at the peripheral circuit portion.

In an embodiment, after the flexible substrate is cut along the cutting lines surrounding the display unit, a laser beam is further illuminated at a bottom surface of the rigid substrate relatively far away from the flexible substrate, such that a focus of the laser beam is on an interface between the rigid substrate and flexible substrate so as to separate the rigid substrate and the flexible substrate.

In an embodiment, after the flexible substrate is cut along the cutting lines surrounding the display unit, a releasing step is further performed so as to separate the rigid substrate and the flexible substrate.

In an embodiment, the first adhesive material includes a silane-based compound, an UV glue, an optically clear adhesive, a glass frit, or a thermal curing adhesive.

In an embodiment, the display unit includes a liquid crystal display unit, and electrophoretic display unit or an organic light-emitting display unit.

According to the foregoing. the manufacturing method for the flexible display apparatus of the invention mainly utilizes the first adhesive material located between the cutting portion of the flexible substrate and the rigid substrate to adhere the cutting portion of the flexible substrate onto the rigid substrate, so after the supporting portion and the cutting portion of the flexible substrate are separated, the supporting portion of the flexible substrate and the rigid substrate can be easily separated from each other, and thus a production efficiency and a production yield of the flexible display apparatus are enhanced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
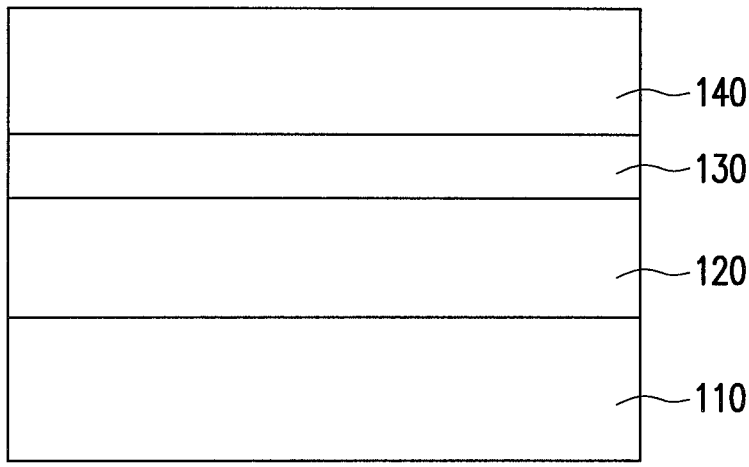
FIG. 1 and FIG. 2 are schematic flow chart diagrams illustrating a conventional manufacturing method for a flexible display apparatus.
Figure 2:
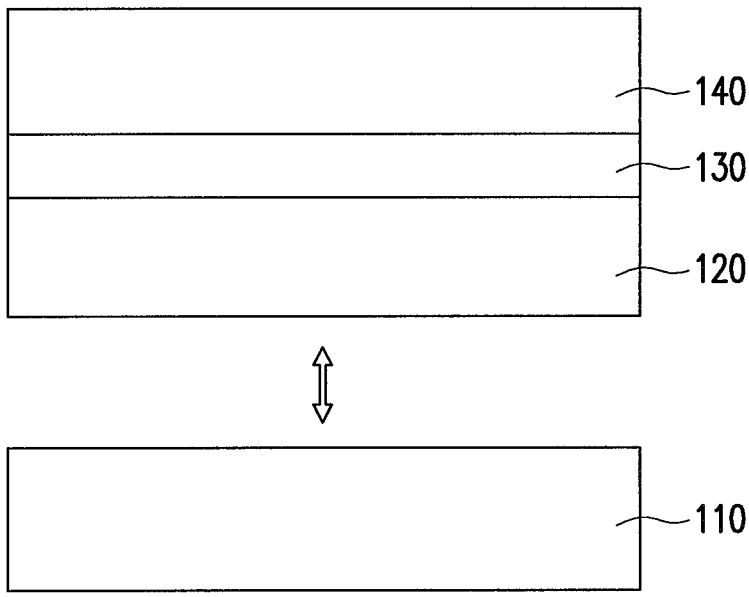
Figure 3:
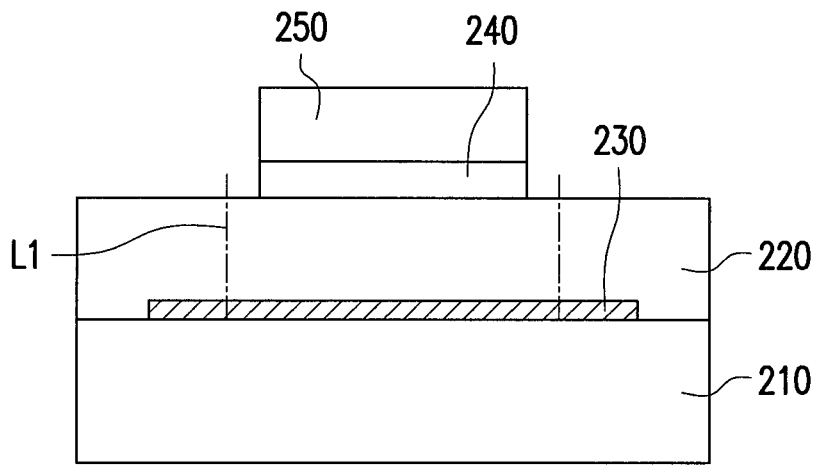
FIG. 3 and FIG. 4 are schematic flow chat diagrams illustrating another conventional manufacturing method for a flexible display apparatus.
Figure 4:
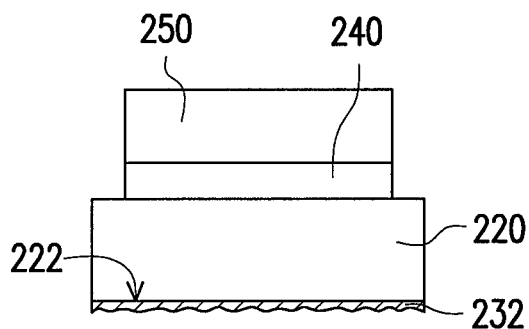
Figure 4:
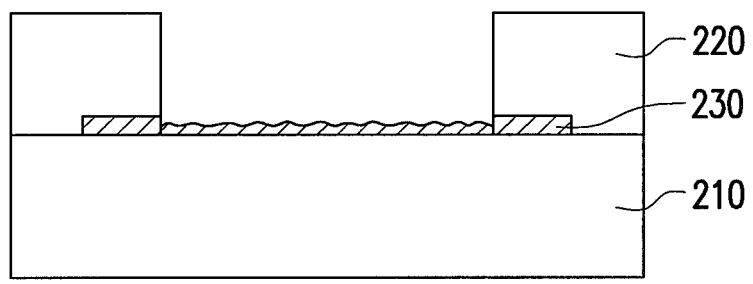
Figure 5A:
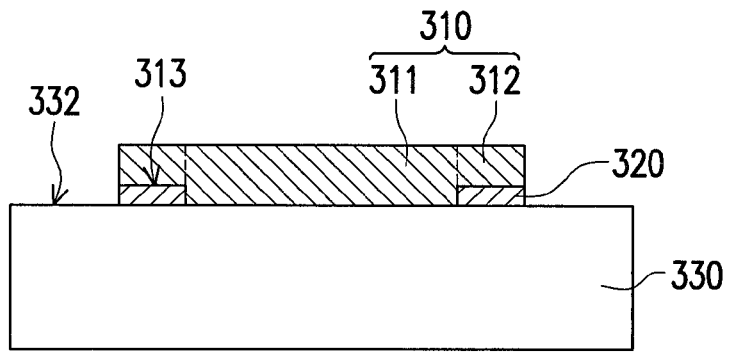
FIG. 5A to FIG. 5D are schematic flow chat diagrams illustrating a manufacturing method for a flexible display apparatus according to an embodiment.

FIG. 5A to FIG. 5D are schematic flow chat diagrams illustrating a manufacturing method for a flexible display apparatus according to an embodiment. FIG. 6 is a schematic top view illustrating a flexible substrate in FIG. 5A. Referring to FIG. 5A and FIG. 6, the manufacturing method for the flexible display apparatus of the present embodiment includes the following steps: firstly, a rigid substrate 330 is provided, wherein the rigid substrate 330 is, for example, a glass substrate, but is not limited thereto.

Next, referring to FIG. 5A, a flexible substrate 310 is provided. The flexible substrate 310 has a supporting portion 311 and a cutting portion 312 surrounding the supporting portion 311, wherein a dividing line between the supporting portion 311 and the cutting portion 312 is represented with dashed line, but the invention is not limited to a trajectory of this dividing line. The flexible substrate 310 may be a stainless steel foil, a polyimide (PI) thin film or other suitable flexible film. Herein, the flexible substrate 310 is being described with a stainless copper foil for instance.

Next, referring to FIG. 5A again, a first adhesive material 320 is formed between the rigid substrate 330 and the cutting portion 312 of the flexible substrate 310, so that the flexible substrate 310 is adhered onto the rigid substrate 330 by the first adhesive material 320. Especially, the first adhesive material 320 is not located on the supporting portion 311 of the flexible substrate 310. Specifically, in the present embodiment, the first adhesive material 320 is only located between the cutting portion 312 of the flexible substrate 310 and the rigid substrate 330, and the supporting portion 311 of the flexible substrate 310 is, for example, in contact with the rigid substrate 330, but not adhered to the rigid substrate 330. In addition, the first adhesive material 320, for example, includes a silane-based compound, an UV glue, an optically clear adhesive, a glass frit, or a thermal curing adhesive.

Herein, the steps of forming the first adhesive material 320 between the rigid substrate 330 and the cutting portion 312 of the flexible substrate 310 include: firstly adhering the first adhesive material 320 at a bottom surface 313 of the flexible substrate 310 opposite to the rigid substrate 330, and the first adhesive material 320 is located at the cutting portion 312; and next, press fitting the bottom surface 313 of the flexible substrate 310 onto the rigid substrate 330, so that the cutting portion 312 of the flexible substrate 310 is adhered onto the rigid substrate 330 by the first adhesive material 320. Understandably, in other embodiments, a method for adhering the cutting portion 312 of the flexible substrate 310 onto the rigid substrate 330 may be to firstly adhere the first adhesive material 320 at a top surface 322 of the rigid substrate 330 opposite to the flexible substrate 310, such that a distribution range of the first adhesive material 320 is corresponded to the cutting portion 312 of the flexible substrate 310, and then to press fit the flexible substrate 310 onto the rigid substrate 330.

Figure 5B:
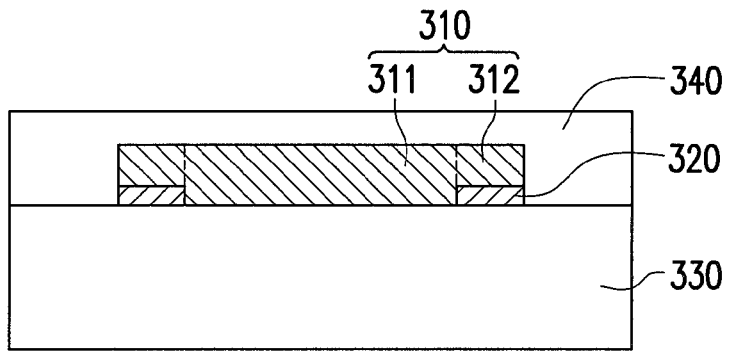
Figure 6:
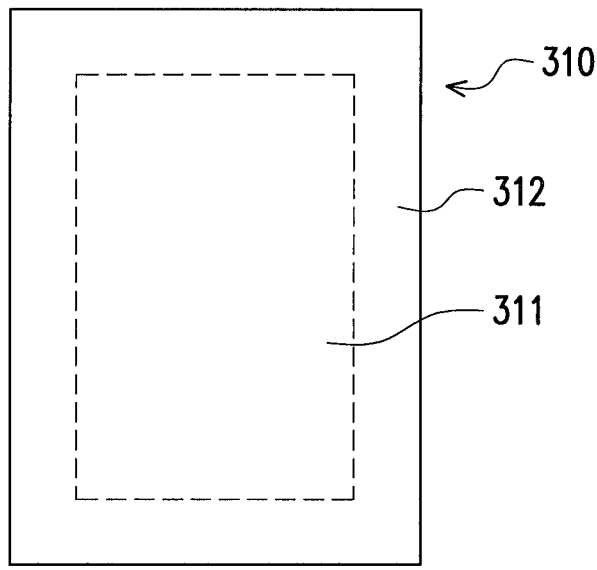
FIG. 6 is a schematic top view illustrating a flexible substrate in FIG. 5A.

Then, as shown in FIG. 5B, an isolation layer 340 covering the flexible substrate 310 is formed on the rigid substrate 330, and the isolation layer 340 is further covering the periphery of the flexible substrate 310. A material of the isolation layer 340 may be a silicon nitride (SiN), a silicon oxide (SiO), a silicon oxynitride (SiNxOy), a polyimide (PI), or other suitable material.

Figure 5C:
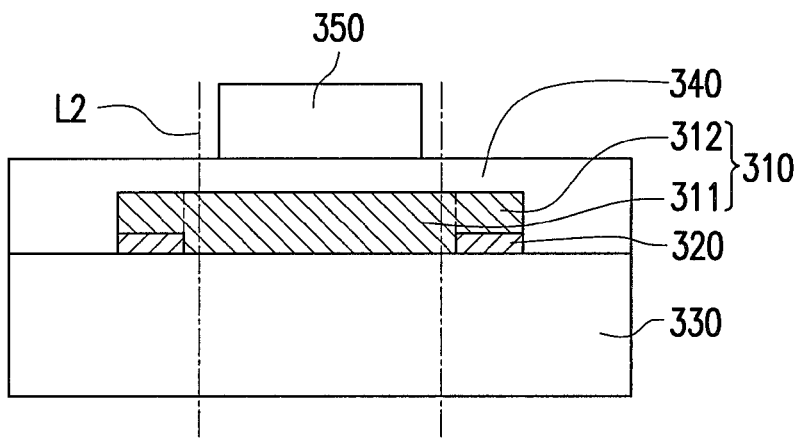

Next, as shown in FIG. 5C, a display unit 350 is formed on the isolation layer 340. The display unit 350 is formed at a location corresponding to the supporting portion 311 of the flexible substrate 310 on the isolation layer 340. The display unit 350 may be a liquid crystal display unit, an electrophoretic display unit, an organic light-emitting display unit, or other suitable display unit. In an embodiment, the display unit 350 may include a driving circuit layer, a display dielectric layer disposed on the driving circuit layer (e.g., a liquid crystal layer, an electrophoresis layer or so on), and a protection layer disposed on the display dielectric layer.

It is required to indicate that, in another embodiment, the isolation layer 340 can be omitted, and under this circumstance, the display unit 350 is directly formed on the supporting portion 311 of the flexible substrate 310.

Figure 5D:
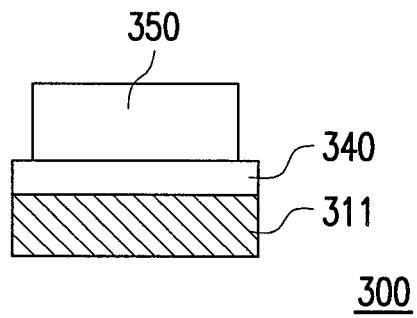

Then, after the display unit 350 is formed, the supporting portion 311 and the cutting portion 312 of the flexible substrate 310 are separated in order to obtain a flexible display apparatus 300, as shown in FIG. 5D. Specifically, a method for separating the supporting portion 311 and the cutting portion 312 is, for example, to cut the flexible substrate 310 along a plurality of cutting lines L2 surrounding the display unit 350 so as to separate the supporting portion 311 and the cutting portion 312. After the supporting portion 311 and the cutting portion 312 are separated, the supporting portion 311 and the rigid substrate 330 can be separated in order to obtain the flexible display apparatus 300. The cutting lines L2 are located within a range of the supporting portion 311. In another embodiment, the cutting lines L2 may also be a dividing line between the supporting portion 311 and the cutting portion 312. In addition, in the present embodiment, when cutting the flexible substrate 310, the isolation layer 340 is being cut at the same time. In another embodiment, when cutting the flexible substrate 310, the rigid substrate 330 may also be cut at the same time.

In the manufacturing method for the flexible display apparatus of the present embodiment, the cutting portion 312 of the flexible substrate 310 is adhered on the rigid substrate 330 by the first adhesive material 320, and no adhesive material is disposed between the supporting portion 311 of the flexible substrate 310 and the rigid substrate 330; therefore, after the supporting portion 311 and the cutting portion 312 of the flexible substrate 310 are separated, the flexible substrate 310 and the rigid substrate 330 can be easily separated without applying a stress because no adhesive material is existed between the supporting portion 311 of the flexible substrate 310 and the rigid substrate 330. As a consequence, a production yield and a production efficiency of the flexible display apparatus 300 can be enhanced. Moreover, since no adhesive material is remained on the supporting portion 311 of the flexible substrate 310, a procedure and a processing time for removing the residual adhesive material can be eliminated, so as to further enhance the production efficiency and reduce a production cost.

It is required to explain that, in the embodiment shown in FIG. 5A, the supporting portion 311 of the flexible substrate 310 is, for example, in contact with the rigid substrate 330, but in other embodiments, a spacing may be existed between the supporting portion 311 of the flexible substrate 310 and the rigid substrate 330. The following is coordinated with figures to describe an embodiment with a spacing existed between the supporting portion 311 of the flexible substrate 310 and the rigid substrate 330.

Figure 7:
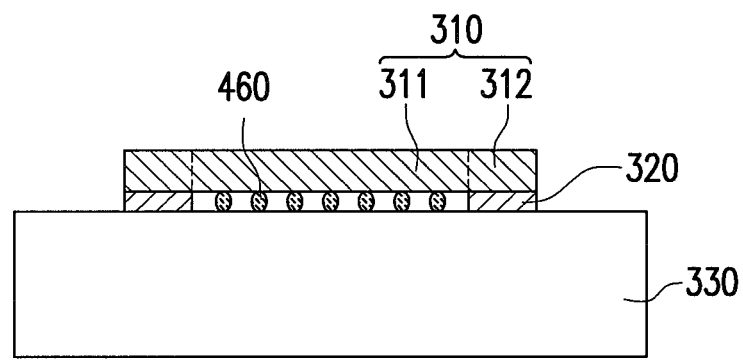
FIG. 7 is a schematic diagram illustrating a step of a manufacturing method for a flexible display apparatus according to an embodiment.

As shown in FIG. 7, in an embodiment with a spacing existed between the supporting portion 311 of the flexible substrate 310 and the rigid substrate 330, when the first adhesive material 320 is simultaneously formed between the rigid substrate 330 and the cutting portion 312 of the flexible substrate 310, a plurality of spacers 460 may be further formed between the supporting portion 311 of the flexible substrate 310 and the rigid substrate 330 so as to maintain the spacing between the supporting portion 311 of the flexible substrate 310 and the rigid substrate 330. The spacers 460 are dispersed between the supporting portion 311 of the flexible substrate 310 and the rigid substrate 330. Herein, the spacers 460 may be a bump, a bead, a fiber, a photoresist, or so on, but is not limited thereto. In addition, in another embodiment (not shown), the spacers 460 may be omitted. It is required to explain that, when the flexible substrate 310 and the rigid substrate 330 are separated, the spacers 460 and the first adhesive material 320 are removed at the same time.

Figure 8:
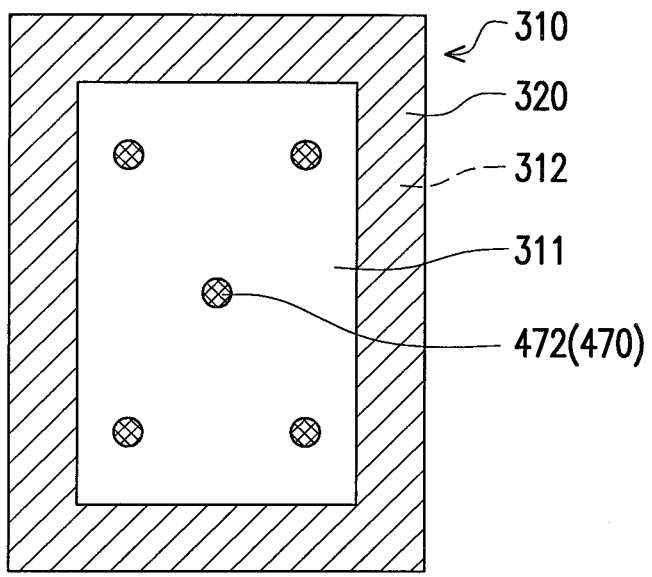
FIG. 8 is a schematic top view illustrating a flexible substrate in a step of a manufacturing method for a flexible display apparatus according to another embodiment.

As shown in FIG. 8, in another embodiment with a spacing existed between the supporting portion 311 of the flexible substrate 310 and the rigid substrate (referring to the rigid substrate 330 in FIG. 7), when the first adhesive material 320 is simultaneously formed between the rigid substrate and the cutting portion 312 (part being covered by the first adhesive material 320) of the flexible substrate 310, a second adhesive material 470 is further formed between the supporting portion 311 of the flexible substrate 310 and the rigid substrate, so that the supporting portion 311 of the flexible substrate 310 is adhered onto the rigid substrate. In the present embodiment, the second adhesive material 470 includes a plurality of dotted adhesive material 472.

In the present embodiment, since the second adhesive material 470 includes the dotted adhesive material 472, an adhesive force provided by the second adhesive material 470 is weaker. Therefore, after the supporting portion 311 and the cutting portion 312 of the flexible substrate 310 are separated, the supporting portion 311 of the flexible substrate 310 and the rigid substrate can be separated by applying a small force. As a consequence, the display unit (referring to the display unit 350 in FIG. 5D) or other components formed on the supporting portion 311 may be avoided from the damage. In addition, in order to enable the supporting portion 311 and the rigid substrate to be separated more easily, a viscosity of the selected second adhesive material 470 may be smaller than a viscosity of the first adhesive material 320. Herein, the second adhesive material 470, for example, includes a silane-based compound, an UV glue, an optically clear adhesive, a glass frit, or a thermal curing adhesive.

Figure 9:
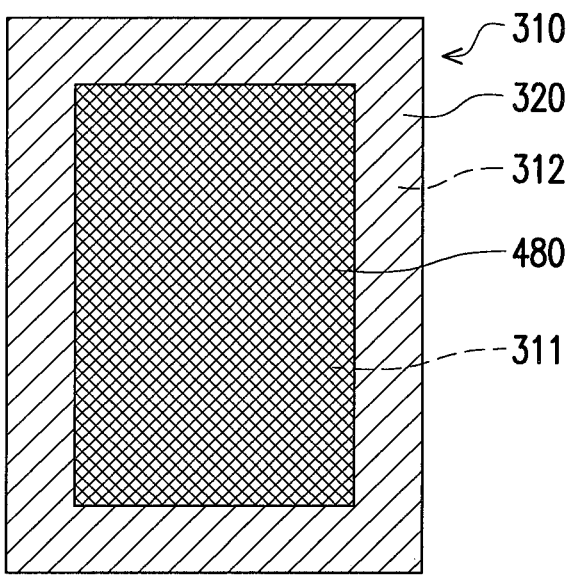
FIG. 9 is a schematic top view illustrating a flexible substrate in a step of a manufacturing method for a flexible display apparatus according to yet another embodiment.

As shown in FIG. 9, in yet another embodiment with a spacing existed between the supporting portion 311 of the flexible substrate 310 and the rigid substrate, when the first adhesive material 320 is simultaneously formed between the rigid substrate and the cutting portion 312 (part being covered by the first adhesive material 320) of the flexible substrate 310, a second adhesive material 480 is further formed between the supporting portion 311 of the flexible substrate 310 and the rigid substrate, so that the supporting portion 311 (part being covered by the second adhesive material 480) of the flexible substrate 310 is adhered onto the rigid substrate. The second adhesive material 480 is a planar adhesive material, for example, the supporting portion 311 which entirely covers the flexible substrate 310. In another embodiment, the second adhesive material 480 appeared in planar may also be partially covering the supporting portion 311 of the flexible substrate 310. In addition, the second adhesive material 480 is a low adhesive material, and the viscosity thereof is smaller than the viscosity of the first adhesive material 320.

In the present embodiment, since the second adhesive material 480 is the low adhesive material, after the supporting portion 311 and the cutting portion 312 of the flexible substrate 310 are separated, the supporting portion 311 of the flexible substrate 310 and the rigid substrate can be easily separated by applying a small force. As a consequence, the display unit (referring to the display unit 350 in FIG. 5D) or other components formed on the supporting portion 311 may be avoided from the damage.

Figure 10:
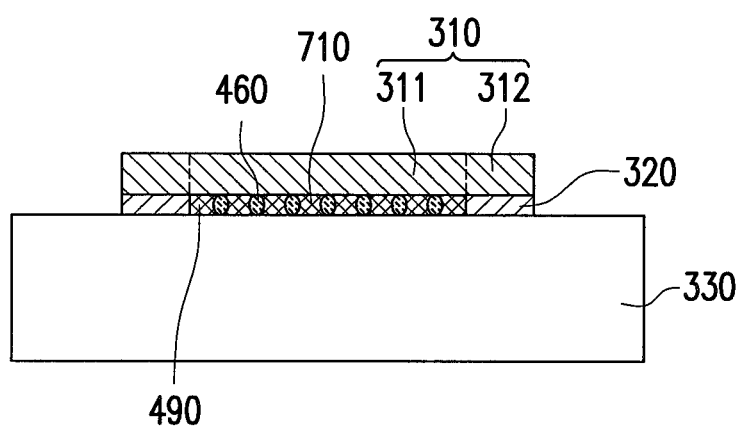
FIG. 10 a schematic diagram illustrating a step of a manufacturing method for a flexible display apparatus according to still another embodiment.

As shown in FIG. 10, in still another embodiment with a spacing existed between the supporting portion 311 of the flexible substrate 310 and the rigid substrate 330, when the first adhesive material 320 is simultaneously formed between the rigid substrate and the cutting portion 312 of the flexible substrate 310, a second adhesive material 490 is further formed to adhered the supporting portion 311 of the flexible substrate 310 onto the rigid substrate 330, and the spacing between the supporting portion 311 and the rigid substrate 330 is maintained by the spacers 460. The second adhesive material 490 may be a planar adhesive material or a plurality of dotted adhesive materials. The viscosity of the second adhesive material 490 may be smaller than the viscosity of the first adhesive material 320 in order to facilitate the subsequent separations of the supporting portion 311 and the rigid substrate 330.

Figure 11A:
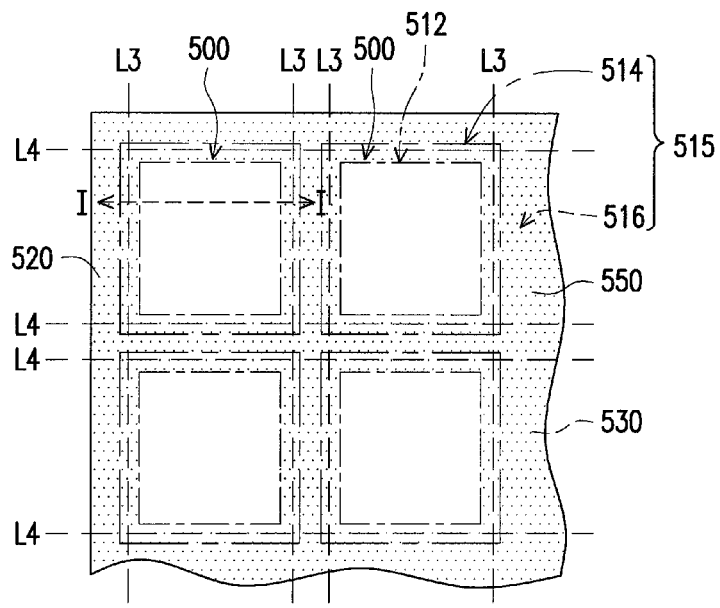
FIG. 11A is a schematic top view illustrating a plurality of flexible display apparatuses before cutting according to another embodiment.
Figure 11B:
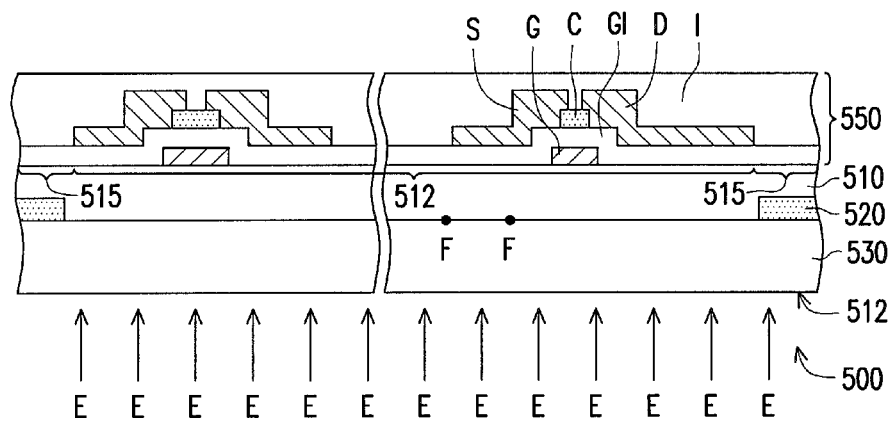
FIG. 11B is a schematic cross-sectional view along a line I-I in FIG. 11A.
Figure 11C:
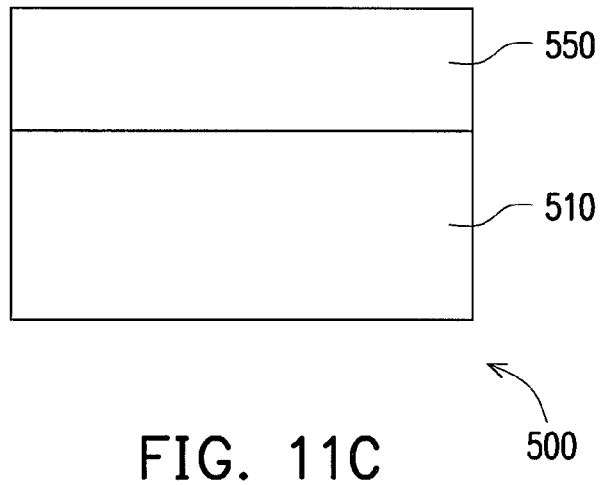
FIG. 11C is schematic cross-sectional view illustrating a single flexible display apparatus after cutting FIG. 11A.

FIG. 11A is a schematic top view illustrating a plurality of flexible display apparatuses before cutting according to another embodiment. FIG. 11B is a schematic cross-sectional view along a line I-I in FIG. 11A. FIG. 11C is schematic cross-sectional view illustrating a single flexible display apparatus after cutting FIG. 11A. It is required to explain that, for the continence of illustration, FIG. 11C has omitted some components. The present embodiment has adopted component notations and part of the contents from the previous embodiments, wherein the same notations are used for representing the same or similar components, and descriptions of the same technical contents are omitted. The descriptions regarding to the omitted part may be referred to the previous embodiments, and thus is not repeated herein.

Referring to FIG. 11A and FIG. 11B, in the present embodiment, according to the manufacturing method for the flexible display apparatus, a rigid substrate 530 is firstly provided, wherein the rigid substrate 530 is, for example, a flexible substrate, but is not limited thereto.

Next, a flexible substrate 510 is provided, wherein the flexible substrate 510 has at least a supporting portion 512 and a cutting portion 515 surrounding the supporting portion 512. More specifically, referring to FIG. 11A, in the present embodiment, the cutting portion 515 of the flexible substrate 510 may be divided into a peripheral circuit portion 514 surrounding the supporting portion 512 and a peripheral non-circuit portion 516 surrounding the peripheral circuit portion 514. The flexible substrate 510 may be a stainless steel foil, a polyimide (PI) thin film or other suitable flexible film. Herein, the flexible substrate 510 is being described with the polyimide (PI) thin film for instance.

Next, referring to FIG. 11A and FIG. 11B again, a first adhesive material 520 is formed between the rigid substrate 530 and the cutting portion 515 of the flexible substrate 510, so that the flexible substrate 510 is adhered onto rigid substrate 530 by the first adhesive material 520. More specifically, the first adhesive material 520 is only located at the peripheral circuit portion 514 and the peripheral non-circuit portion 516 of the flexible substrate 510; especially, the first adhesive material 520 is not located at the supporting portion 512 of the flexible substrate 510, wherein the supporting portion 512 of the flexible substrate 510 is, for example, in contact with the rigid substrate 530. In addition, the first adhesive material 520, for example, includes a silane-based compound, an UV glue, an optically clear adhesive, a glass frit, or a thermal curing adhesive.

Herein, the steps of forming the first adhesive material 520 between the rigid substrate 530 and the cutting portion 515 of the flexible substrate 510 include: firstly adhering the first adhesive material 520 at the cutting portion 515 of the flexible substrate 510; and next, press fitting the flexible substrate 510 onto the rigid substrate 530, so that the cutting portion 515 of the flexible substrate 510 is adhered onto the rigid substrate 530 by the first adhesive material 520. Understandably, in other embodiments, a method for adhering the cutting portion 515 of the flexible substrate 510 onto the rigid substrate 530 may be to firstly adhere the first adhesive material 520 at the rigid substrate 530, such that a distribution range of the first adhesive material 520 is corresponded to the cutting portion 515 of the flexible substrate 510, and then to press fit the flexible substrate 510 onto the rigid substrate 530.

Next, referring to FIG. 11B again, at least a display unit 550 is formed on the supporting portion 512 of the flexible substrate 510. The display unit 550 may be a liquid crystal display unit, an electrophoretic display unit, an organic light-emitting display unit, or other suitable display unit. Wherein, the display unit 550, for example, employs an active element array constituted of sequentially stacking a gate electrode G, a gate insulation layer GI, a semiconductor channel layer C, a source S/drain D, and a protection layer I as a switching element. In an embodiment, the display unit 550 may include a driving circuit layer, a display dielectric layer (e.g., a liquid crystal layer, an electrophoresis layer, or so on) disposed on the driving circuit layer, and a protection layer disposed on the display dielectric layer.

Next, referring to FIG. 11A and FIG. 11C, the supporting portion 512 and the cutting portion 515 of the flexible substrate 510 are separated in order to obtain the flexible display apparatus 500, as shown in FIG. 11C. Specifically, a method for separating the supporting portion 512 and the cutting portion 515 of the flexible substrate 510 is, for example, cutting the flexible substrate 510 along a plurality of cutting lines L3 and L4 surrounding the display unit 550 so as to separate the supporting portion 512 and the cutting portion 515. Herein, the cutting lines L3 and L4 are located within the peripheral circuit portion 514 of the cutting portion 515.

Next, referring to FIG. 11B and FIG. 11C, a laser beam E is then illuminated at a bottom surface 532 of the rigid substrate 530 relatively far away from the flexible substrate 510, such that a focus F of the laser beam E is on an interface between the rigid substrate 530 and the flexible substrate 510, and the rigid substrate 530 and the flexible substrate 510 are separated by a method of altering molecular bonding. Certainly, in other embodiments (not shown), a releasing step may further be performed after the supporting portion 512 and the cutting portion 515 of the flexible substrate 510 are separated; a manual releasing method is to separate the rigid substrate 530 from the flexible substrate 510. The two aforementioned methods for separating the rigid substrate 530 and the flexible substrate 510 are all applicable technical schema of the invention without departing from the scope or spirit of the invention. At this point, the manufacture of the flexible display apparatus 500 is thus completed.

Figure 11D:
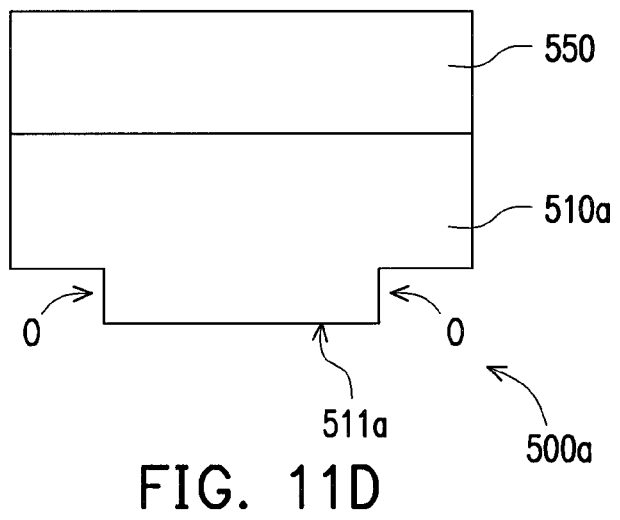
FIG. 11D is schematic cross-sectional view illustrating the flexible display apparatus according to another embodiment.
Figure 11E:
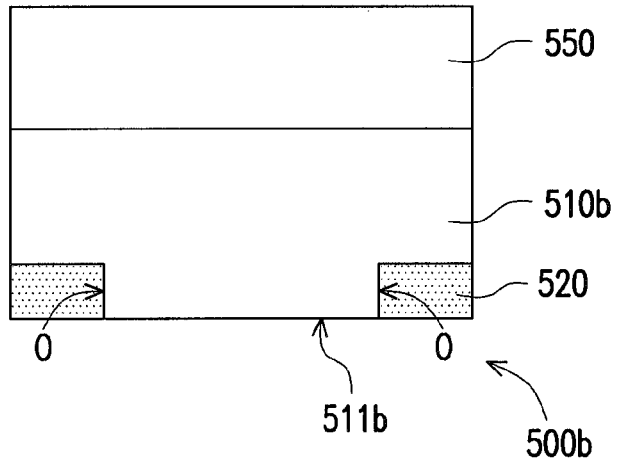
FIG. 11E is schematic cross-sectional view illustrating the flexible display apparatus according to another embodiment.

Note worthily, since the first adhesive material 520 is disposed at the cutting portion 515 of the flexible substrate 510, and the cutting lines L3 and L4 are located within the peripheral circuit portion 514 of the cutting portion 515, after cutting, referring to FIG. 11D, a plurality of notches O may be appeared around a surface 511a of a flexible substrate 510a of a flexible display apparatus 500a far away from the display unit 550, namely, the notches O are produced due to the removal of the first adhesive material 520; certainly, referring to FIG. 11E, a plurality of notches O may be appeared around a surface 511b of a flexible substrate 510b of a flexible display apparatus 500b far away from the display unit 550, and the first adhesive material 520 is to fill up the notches O, namely, the first adhesive material 520 is not completed removed.

Since a method for manufacturing the flexible display apparatus 500, in the present embodiment, utilizes the first adhesive material 520 to adhere the cutting portion 515 of the flexible substrate 510 onto the rigid substrate 530, and no first adhesive material 520 is disposed between the supporting portion 512 of the flexible substrate 510 and the rigid substrate 530, when manufacturing the display unit 550, the first adhesive material 520 may provide an effective adhesion force to enable the flexible substrate 510 and the rigid substrate 530 to adhere together, so that the flexible substrate 510 is able to use the rigid substrate 530 as a supporting plate to manufacture the display unit 550 thereon, and thus a structural strength during the manufacturing may be enhance. Furthermore, after the supporting portion 512 and the cutting portion 515 of the flexible substrate 510 are separated, since no first adhesive material 520 is existed between the supporting portion 512 of the flexible substrate 510 and the rigid substrate 530, and no residual of the first adhesive material 520 is remained at the supporting portion 512 of the flexible substrate 510, the procedure and the processing time for removing the residual of the first adhesive material 520 may be eliminated, so as to further enhance the production efficiency and reduce the production cost.

In summary, the manufacturing method for the flexible display apparatus of the invention mainly utilizes the first adhesive material located between the cutting portion of the flexible substrate and the rigid substrate to adhere the cutting portion of the flexible substrate onto the rigid substrate, so after the supporting portion and the cutting portion of the flexible substrate are separated, the supporting portion of the flexible substrate and the rigid substrate can be easily separated from each other. Therefore, the production efficiency and the production yield of the flexible display apparatus can be enhanced. In addition, no adhesive material is remained in the surface of the supporting portion of the flexible substrate opposite to the rigid substrate, and thus the procedure and the processing time for removing the residual adhesive material may be eliminated, so as to further enhance the production efficiency and reduce the production cost.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A manufacturing method for a flexible display apparatus comprising:
   providing a rigid substrate;
   providing a flexible substrate having at least a supporting portion and a cutting portion surrounding the supporting portion;
   forming a first adhesive material between the rigid substrate and the cutting portion of the flexible substrate by:
      adhering the first adhesive material at a bottom surface of the flexible substrate opposite to the rigid substrate, and the first adhesive material is located at the cutting portion; and
      press fitting the bottom surface of the flexible substrate onto the rigid substrate,
   so that the flexible substrate is adhered onto the rigid substrate by the first adhesive material, wherein the first adhesive material does not locate on the supporting portion of the flexible substrate;
   forming at least a display unit on the supporting portion of the flexible substrate; and
   separating the supporting portion and the cutting portion of the flexible substrate to separate the rigid substrate and the flexible substrate, wherein the flexible substrate and the display unit thereon form a flexible display apparatus.

2. The manufacturing method for the flexible display apparatus as recited in claim 1, wherein before forming the display unit, further comprising:
   forming an isolation layer covering the flexible substrate on the rigid substrate, and the display unit is formed on the isolation layer.

3. The manufacturing method for the flexible display apparatus as recited in claim 2, wherein a material of the isolation layer comprises a silicon nitride (SiN), a silicon oxide (SiO), a silicon oxynitride (SiNxOy), or a polyimide (PI).

4. The manufacturing method for the flexible display apparatus as recited in claim 1, wherein the flexible substrate comprises a stainless steel foil or a polyimide (PI) thin film.

5. The manufacturing method for the flexible display apparatus as recited in claim 1, wherein when simultaneously forming the first adhesive material between the rigid substrate and the cutting portion of the flexible substrate, further comprising forming a second adhesive material between the supporting portion of the flexible substrate and the rigid substrate, so that the supporting portion of the flexible substrate is adhered onto the rigid substrate.

6. The manufacturing method for the flexible display apparatus as recited in claim 5, wherein a viscosity of the second adhesive material is smaller than a viscosity of the first adhesive material.

7. The manufacturing method for the flexible display apparatus as recited in claim 5, wherein the second adhesive material comprises a planar adhesive material or a plurality of dotted adhesive materials.

8. The manufacturing method for the flexible display apparatus as recited in claim 5, wherein when simultaneously forming the first adhesive material between the rigid substrate and the cutting portion of the flexible substrate, further comprising forming a plurality of spacers between the supporting portion of the flexible substrate and the rigid substrate to maintain a spacing between the supporting portion of the flexible substrate and the rigid substrate.

9. The manufacturing method for the flexible display apparatus as recited in claim 1, wherein when simultaneously forming the first adhesive material between the rigid substrate and the cutting portion of the flexible substrate, further comprising forming a plurality of spacers between the supporting portion of the flexible substrate and the rigid substrate to maintain a spacing between the supporting portion of the flexible substrate and the rigid substrate.

10. The manufacturing method for the flexible display apparatus as recited in claim 1, wherein the step of separating the supporting portion and the cutting portion of the flexible substrate comprises:
    cutting the flexible substrate along a plurality of cutting lines surrounding the display unit, and the cutting lines are located within the range of the supporting portion of the flexible substrate.

11. The manufacturing method for the flexible display apparatus as recited in claim 10, wherein the cutting portion of the flexible substrate is divided into a peripheral circuit portion surrounding the supporting portion and a peripheral non-circuit portion surrounding the peripheral circuit portion, and the cutting lines are located at the peripheral circuit portion.

12. The manufacturing method for the flexible display apparatus as recited in claim 11, wherein after cutting the flexible substrate along the cutting lines surrounding the display unit, further comprising:

illuminating a laser beam at a bottom surface of the rigid substrate relatively far away from the flexible substrate, such that a focus of the laser beam is on an interface between the rigid substrate and the flexible substrate to separate the rigid substrate and the flexible substrate.

13. The manufacturing method for the flexible display apparatus as recited in claim 11, wherein after cutting the flexible substrate along the cutting lines surrounding the display unit, further comprising:

performing a releasing step to separate the rigid substrate and the flexible substrate.

14. The manufacturing method for the flexible display apparatus as recited in claim 1, wherein the first adhesive material comprises a silane-based compound, an UV glue, optically clear adhesive, a glass frit, or a thermal curing adhesive.

15. The manufacturing method for the flexible display apparatus as recited in claim 1, wherein the display unit comprises a liquid crystal display unit, an electrophoretic display unit or an organic light-emitting display unit.

\* \* \* \* \*